United States Patent
Kune et al.

(10) Patent No.: US 8,037,296 B2
(45) Date of Patent: Oct. 11, 2011

(54) APPARATUS AND METHOD FOR COUNTER-BASED COMMUNICATIONS IN WIRELESS SENSOR NETWORKS AND OTHER NETWORKS

(75) Inventors: Denis Foo Kune, Saint Paul, MN (US); Joseph John Kimball, Columbia, MO (US); Thomas L. Phinney, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 556 days.

(21) Appl. No.: 12/136,504

(22) Filed: Jun. 10, 2008

(65) Prior Publication Data

US 2009/0292913 A1    Nov. 26, 2009

Related U.S. Application Data

(60) Provisional application No. 61/055,843, filed on May 23, 2008.

(51) Int. Cl.
*H04L 29/06* (2006.01)
*H04K 1/00* (2006.01)

(52) U.S. Cl. ........................ 713/150; 380/255

(58) Field of Classification Search .................. 713/150; 380/255
See application file for complete search history.

(56) References Cited

OTHER PUBLICATIONS

Hart Communication Protocol, "Network Management Specification", HCF_SPEC-085, Revision 1.1, May 30, 2008, 92 pages, see esp. 8.1.3.3 & 8.1.3.4.
Mark Luk, et al., "MiniSec: A Secure Sensor Network Communication Architecture", IPSN'07, Apr. 25-27, 2007, p. 479-488.

*Primary Examiner* — Jacob Lipman
(74) *Attorney, Agent, or Firm* — Munck Carter, LLP

(57) ABSTRACT

A method includes wirelessly receiving a message at a receiving node. The method also includes extracting a partial counter value from the message, where the partial counter value represents a subset of bits from a complete counter value of a transmitting node. The method further includes decrypting and authenticating the message based on the partial counter value. Decrypting and authenticating the message could include examining a bitmap to identify a bit value associated with the partial counter value, decrypting and authenticating the message if the identified bit value has a first value, and discarding the message if the identified bit value has a second value. Decrypting and authenticating the message could also include identifying at least one complete counter value at the receiving node based on the partial counter value and attempting to decrypt and authenticate the message using the at least one complete counter value.

20 Claims, 4 Drawing Sheets

APPARATUS AND METHOD FOR COUNTER-BASED COMMUNICATIONS IN WIRELESS SENSOR NETWORKS AND OTHER NETWORKS

CROSS-REFERENCE TO RELATED APPLICATIONS

This application claims priority under 35 U.S.C. §119(e) to U.S. Provisional Patent Application No. 61/055,843 filed on May 23, 2008, which is hereby incorporated by reference.

TECHNICAL FIELD

This disclosure relates generally to wireless networks. More specifically, this disclosure relates to an apparatus and method for counter-based communications in wireless sensor networks and other networks.

BACKGROUND

Processing facilities are often managed using process control systems. Example processing facilities include manufacturing plants, chemical plants, crude oil refineries, and ore processing plants. Among other operations, process control systems typically manage the use of motors, valves, and other industrial equipment in the processing facilities. Process control systems routinely include one or more wireless networks containing various wireless devices, such as wireless sensors and wireless actuators.

SUMMARY

This disclosure provides an apparatus and method for counter-based communications in wireless sensor networks and other networks.

In a first embodiment, a method includes wirelessly receiving a message at a receiving node and extracting a partial counter value from the message. The partial counter value represents a subset of bits from a complete counter value of a transmitting node. The method also includes decrypting and authenticating the message based on the partial counter value.

In particular embodiments, decrypting and authenticating the message includes examining a bitmap to identify a bit value associated with the partial counter value. The message is decrypted and authenticated if the identified bit value has a first value. The message is discarded if the identified bit value has a second value.

In other particular embodiments, decrypting and authenticating the message includes identifying a second complete counter value at the receiving node and attempting to decrypt and authenticate the message using the second complete counter value. The second complete counter value is based on the partial counter value and a value of a counter at the receiving node. Decrypting and authenticating the message may further include, if not successful using the second complete counter value, identifying at least one additional complete counter value and attempting to decrypt and authenticate the message using the one or more additional complete counter values. Identifying the second complete counter value could include using a window of counter values at the receiving node, and identifying the at least one additional complete counter value could include shifting the window of counter values and using the shifted window of counter values.

In yet other particular embodiments, the method also includes requesting the complete counter value from the transmitting node if a specified number of messages cannot be decrypted and authenticated.

In still other particular embodiments, the method also includes updating a bitmap and a window based on the partial counter value after successful authentication of the message. The window is associated with a plurality of partial counter values, and the bitmap includes a plurality of bit values associated with the partial counter values. Updating the bitmap and the window could include advancing the window to cover partial counter values starting with the partial counter value associated with a next expected or missing message and shifting the bitmap to start at a bit value associated with the next expected message or a missing message. Updating the bitmap and the window could also include advancing and centering the window on a partial counter value associated with a most recently received authenticated message and centering the bitmap on a bit value associated with the most recently received authenticated message.

In additional particular embodiments, the receiving node includes a wireless sensor and/or a wireless actuator.

In a second embodiment, an apparatus includes a transceiver configured to wirelessly receive a message. The apparatus also includes a controller configured to extract a partial counter value from the message and to decrypt and authenticate the message based on the partial counter value. The partial counter value represents a subset of bits from a complete counter value of a transmitting node.

In a third embodiment, a method includes generating a message to be wirelessly transmitted and identifying a counter value of a counter, where the counter value includes a number of bits. The method also includes inserting a subset of the bits of the counter value into the message, encrypting and authenticating the message using the counter value, and transmitting the message.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 6, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
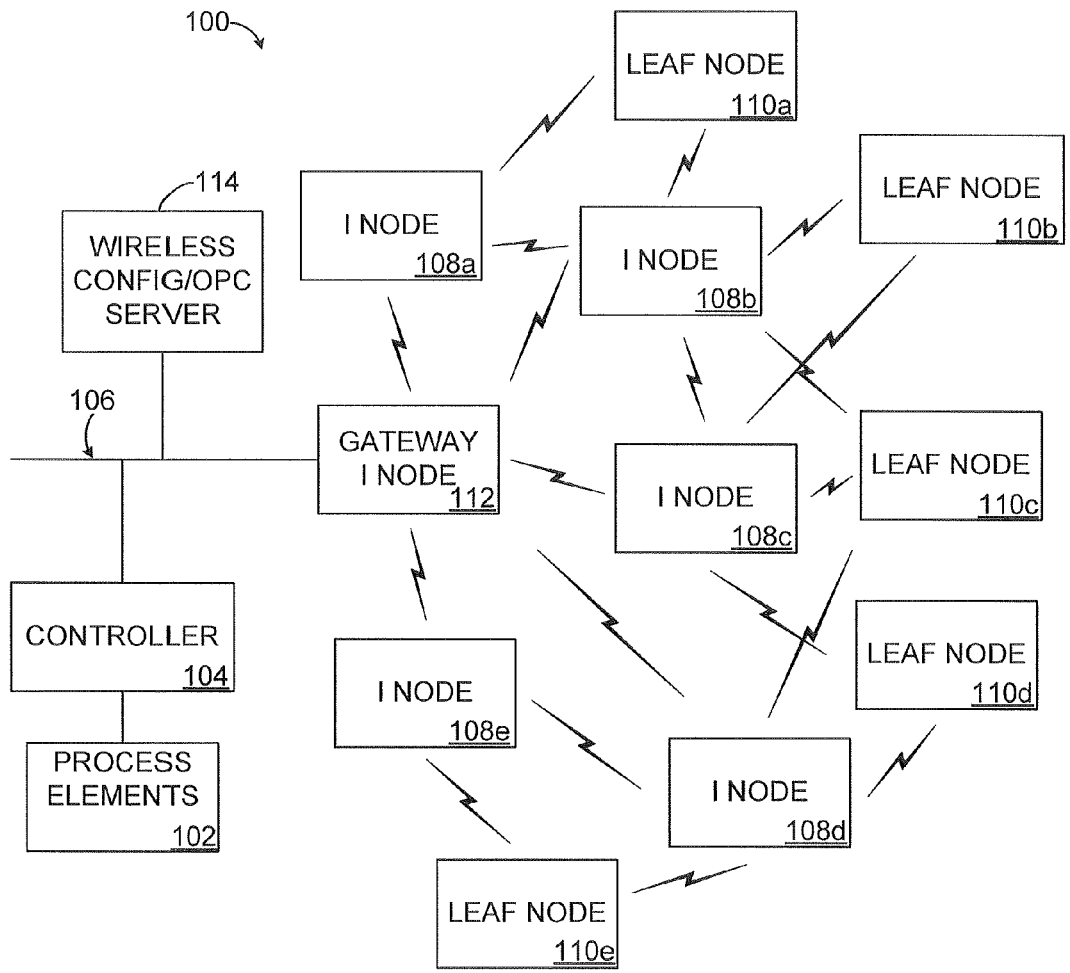
FIG. 1 illustrates an example process control system according to this disclosure.

FIG. 1 illustrates an example process control system 100 according to this disclosure. The embodiment of the process control system 100 shown in FIG. 1 is for illustration only. Other embodiments of the process control system 100 could be used without departing from the scope of this disclosure.

In this example embodiment, the process control system 100 includes one or more process elements 102. The process elements 102 represent components in a process system that perform any of a wide variety of functions. For example, the process elements 102 could represent sensors, actuators, or any other or additional industrial equipment in a processing environment. Each process element 102 includes any suitable structure for performing one or more functions in a process system. Also, a process system may represent any system or portion thereof configured to process one or more materials in some manner.

A controller 104 is coupled to the process elements 102. The controller 104 controls the operation of one or more of the process elements 102. For example, the controller 104 could receive information associated with the process system, such as sensor measurements from some of the process elements 102. The controller 104 could use this information to provide control signals to others of the process elements 102, thereby adjusting the operation of those process elements 102. The controller 104 includes any hardware, software, firmware, or combination thereof for controlling one or more process elements 102. The controller 104 could, for example, represent a computing device executing a MICROSOFT WINDOWS operating system.

A network 106 facilitates communication between various components in the system 100. For example, the network 106 may communicate Internet Protocol (IP) packets, frame relay frames, Asynchronous Transfer Mode (ATM) cells, or other suitable information between network addresses. The network 106 may include one or more local area networks, metropolitan area networks, wide area networks (WANs), all or a portion of a global network, or any other communication system or systems at one or more locations.

In FIG. 1, the process control system 100 also includes one or more wireless networks for communicating with wireless sensors or other devices. In this example, a wireless network includes infrastructure nodes ("I nodes") 108a-108e, leaf nodes 110a-110e, and a gateway infrastructure node 112.

The infrastructure nodes 108a-108e and the leaf nodes 110a-110e engage in wireless communications with each other. For example, the infrastructure nodes 108a-108e may receive data transmitted over the network 106 (via the gateway infrastructure node 112) and wirelessly communicate the data to the leaf nodes 110a-110e. Similarly, the leaf nodes 110a-110e may wirelessly communicate data to the infrastructure nodes 108a-108e for forwarding to the network 106 (via the gateway infrastructure node 112). In addition, the infrastructure nodes 108a-108e may wirelessly exchange data with one another. In this way, the nodes 108a-108e form a wireless network capable of providing wireless coverage to leaf nodes and other devices in a specified area, such as a large industrial complex.

In this example, the nodes 108a-108e and 110a-110e are divided into infrastructure nodes and leaf nodes. The infrastructure nodes 108a-108e typically represent line-powered devices, meaning these nodes receive operating power from an external source. Infrastructure nodes 108a-108e are typically not limited in their operations since they need not minimize power consumption to increase the operational life of their internal power supplies. On the other hand, the leaf nodes 110a-110e typically represent devices powered by local power supplies, such as nodes that receive operating power from internal batteries or other internal power supplies. Leaf nodes 110a-110e are often more limited in their operations in order to help preserve the operational life of their internal power supplies.

The nodes 108a-108e and 110a-110e include any suitable structures facilitating wireless communications, such as radio frequency (RF) frequency hopping spread spectrum (FHSS) transceivers. The nodes 108a-108e and 110a-110e could also include other functionality, such as functionality for generating or using data communicated over the wireless network. For example, the leaf nodes 110a-110e could represent wireless sensors used to measure various characteristics within an industrial facility. The sensors could collect and communicate sensor readings to the controller 104 via the gateway infrastructure node 112. The leaf nodes 110a-110e could also represent actuators that receive control signals from the controller 104 and adjust the operation of the industrial facility. In this way, the leaf nodes 110a-110e may include or operate in a similar manner as the process elements 102 physically connected to the controller 104. The leaf nodes 110a-110e could further represent handheld user devices (such as INTELATRAC devices from HONEYWELL INTERNATIONAL INC.), mobile stations, programmable logic controllers, or any other or additional devices.

The gateway infrastructure node 112 communicates wirelessly with, transmits data to, and receives data from one or more infrastructure nodes and possibly one or more leaf nodes. The node 112 also converts data between protocol(s) used by the network 106 and protocol(s) used by the nodes 108a-108e and 110a-110e. For example, the node 112 could convert Ethernet-formatted data transported over the network 106 into a wireless protocol format (such as an IEEE 802.11a, 802.11b, 802.11g, 802.11n, 802.15.3, 802.15.4, or 802.16 format) used by the nodes 108a-108e and 110a-110e. The node 112 could also convert data received from one or more of the nodes 108a-108e and 110a-110e into Ethernet-formatted data for transmission over the network 106. In addition, the node 112 could support various functions, such as network creation and security, used to create and maintain a wireless network. The gateway infrastructure node 112 includes any suitable structure for facilitating communication between components or networks using different protocols.

In particular embodiments, the various nodes in the wireless network of FIG. 1 form a mesh network communicating at 2.4 GHz or 5.8 GHz. Also, in particular embodiments, data can be injected into the wireless mesh network through the infrastructure nodes, thus providing versatile, multifunctional, plant-wide coverage for wireless sensing, asset location tracking, personnel tracking, wireless communications, and any other or additional functionality as desired.

A wireless configuration and OLE for Process Control (OPC) server 114 can configure and control various aspects of the process control system 100. For example, the server 114 could configure the operation of the nodes 108a-108e and 112. The server 114 could also support security in the process control system 100, such as by distributing cryptographic keys or other security data to various components in the process control system 100 (like the nodes 108a-108e, 110a-110e, and 112). The server 114 includes any hardware, software, firmware, or combination thereof for configuring wireless networks and providing security information.

In one aspect of operation, various nodes in a wireless network may engage in counter-based communications. Counter-based communications refer to communications that involve the use of a counter, such as when at least part of a counter value is included in a transmitted or received message or when a counter value is used to encrypt, decrypt, or authenticate a message. As a particular example, the leaf nodes and infrastructure nodes in FIG. 1 could support the EAX mode of encryption defined in the Advanced Encryption Standard (AES) from the National Institute of Standards and Technology (NIST). This standard defines a 128-bit counter that is incremented each time a message is transmitted. In some systems, the entire 128-bit counter value is included in each message that is transmitted by a wireless node. However, this can lead to wasted bandwidth and significant overhead, particularly when the transmitted messages are relatively small.

As described in more detail below, in some embodiments, wireless nodes in a wireless network (such as the leaf nodes and infrastructure nodes) may transmit and receive messages containing a subset of the bits of counter values. For example, the six least significant bits of a counter value can be included in a transmitted message. Moreover, different mechanisms can be used to reduce or eliminate the threat of replay attacks or other attacks on the wireless nodes and to re-synchronize receiving nodes when they lose track of the counter values used by transmitting nodes. In this way, wireless nodes are able to transmit and receive messages with less bandwidth and overhead and in a more secure manner.

Although FIG. 1 illustrates one example of a process control system 100, various changes may be made to FIG. 1. For example, the process control system 100 could include any number of process elements, controllers, networks (wired or wireless), infrastructure nodes (gateway or other), leaf nodes, and servers. Also, the functional division shown in FIG. 1 is for illustration only. Various components in FIG. 1 could be combined, subdivided, or omitted and additional components could be added according to particular needs. In addition, FIG. 1 illustrates one example operational environment where counter-based communications could be used and controlled. This functionality could be used with any suitable device or system, whether or not that device or system is used for process control.

Figure 2:
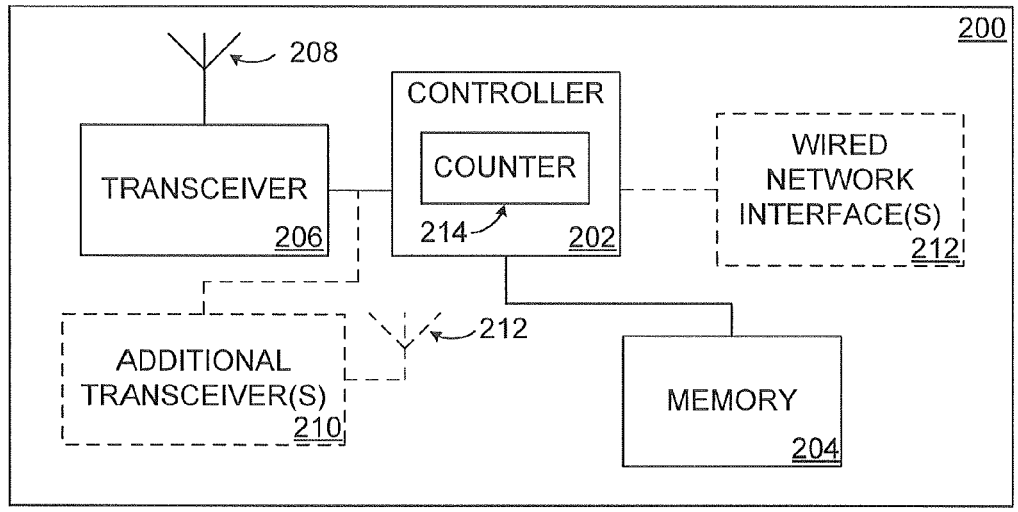
FIG. 2 illustrates an example wireless node in a wireless network according to this disclosure.

FIG. 2 illustrates an example wireless node 200 in a wireless network according to this disclosure. The wireless node 200 could, for example, represent a leaf node or infrastructure node in the system 100 of FIG. 1 or other system. The embodiment of the wireless node 200 shown in FIG. 2 is for illustration only. Other embodiments of the wireless node 200 could be used without departing from the scope of this disclosure.

As shown in FIG. 2, the wireless node 200 includes a controller 202. The controller 202 controls the overall operation of the wireless node 200. For example, the controller 202 may receive or generate data to be transmitted externally, and the controller 202 could provide the data to one or more other components in the wireless node 200 for transmission over a wired or wireless network. The controller 202 could also receive data over a wired or wireless network and use or pass on the data. As a particular example, the controller 202 in a sensor leaf node could provide sensor data for transmission, and the controller 202 in an actuator leaf node could receive and implement control signals (note that a leaf node could represent a combined sensor-actuator device). As another example, the controller 202 in an infrastructure node could receive data transmitted wirelessly, determine a next hop for the data (if any), and provide the data for transmission to the next hop (if any). As a third example, the controller 202 in a gateway infrastructure node 112 could receive data from a wired network and provide the data for wireless transmission (or vice versa). The controller 202 could perform any other or additional functions to support the operation of the wireless node 200. The controller 202 includes any suitable hardware, software, firmware, or combination thereof for controlling the operation of the wireless node 200. As particular examples, the controller 202 could represent a processor, microprocessor, microcontroller, field programmable gate array (FPGA), or other processing or control device.

A memory 204 is coupled to the controller 202. The memory 204 stores any of a wide variety of information used, collected, or generated by the wireless node 200. For example, the memory 204 could store information received over one network that is to be transmitted over the same or different network. The memory 204 includes any suitable volatile and/or non-volatile storage and retrieval device or devices.

The wireless node 200 also includes a wireless transceiver 206 coupled to an antenna 208. The transceiver 206 and antenna 208 can be used by the wireless node 200 to communicate wirelessly with other devices. For example, in a leaf node, the transceiver 206 and antenna 208 can be used to communicate with infrastructure nodes. In an infrastructure node or gateway infrastructure node, the transceiver 206 and antenna 208 can be used to communicate with leaf nodes. One or more additional transceivers 210 could also be used in the wireless node 200. For instance, in an infrastructure node or gateway infrastructure node, the additional transceiver(s) 210 could be used to communicate with WiFi devices (such as wireless controllers or hand-held user devices) and with other infrastructure nodes or gateway infrastructure nodes. The additional transceivers 210 may be coupled to their own antennas 212 or share one or more common antennas (such as antenna 208). Each transceiver includes any suitable structure for transmitting and/or receiving wireless signals via an antenna. In some embodiments, each transceiver represents a radio frequency (RF) transceiver, and each antenna represents an RF antenna (although any other suitable wireless signals could be used to communicate). Also, each transceiver could include a transmitter and a separate receiver.

If the wireless node 200 represents a gateway infrastructure node, the wireless node 200 may further include one or more wired network interfaces 212. The wired network interfaces 212 allow the wireless node 200 to communicate over one or more wired networks, such as the network 106. Each wired network interface 212 includes any suitable structure for transmitting and/or receiving signals over a wired network, such as an Ethernet interface.

As shown in FIG. 2, the controller 202 includes a counter 214. The counter 214 represents any suitable hardware, software, firmware, or combination thereof that increments or decrements a value. As a particular example, the counter 214 could represent a 128-bit counter. The value of the counter 214 can be used for various purposes, such as to support counter-based communications. As a particular example, the controller 202 could use the counter value to perform various encryption, decryption, or authentication functions. As another particular example, the controller 202 could include a subset of the bits from the counter value in messages transmitted by the wireless node 200. Additional details regarding these functions are provided below.

Although FIG. 2 illustrates one example of a wireless node 200 in a wireless network, various changes may be made to FIG. 2. For example, various components in FIG. 2 could be combined, subdivided, or omitted and additional components could be added according to particular needs. Also, in general, a "wireless node" may represent any device that can transmit and/or receive data wirelessly (even if the "wireless node" has the ability to transmit and/or receive data over a wired connection, as well).

Figure 3:
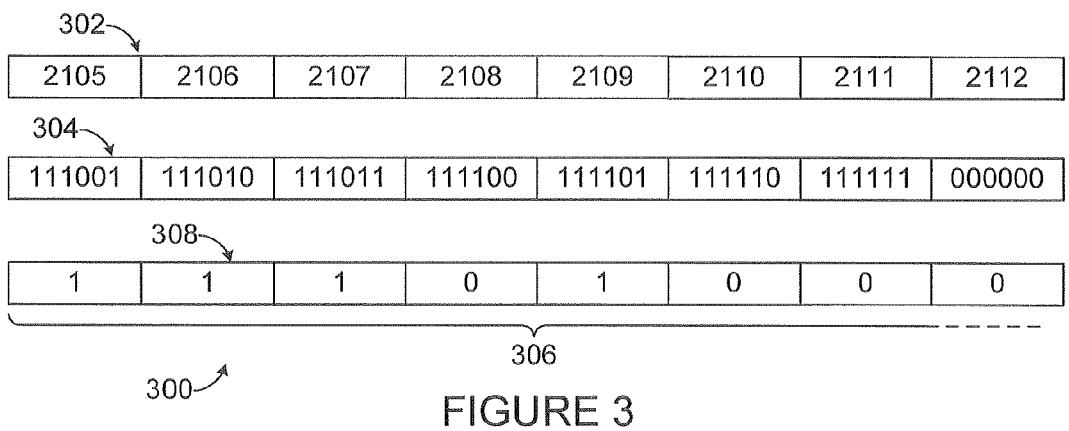
FIG. 3 illustrates example counter-based communications in a wireless network according to this disclosure.

FIG. 3 illustrates example counter-based communications 300 in a wireless network according to this disclosure. The counter-based communications 300 shown in FIG. 3 are for illustration only. Other counter-based communications could also be used without departing from the scope of this disclosure.

In FIG. 3, values 302 represent the values of the counter 214 during transmissions of consecutive wireless messages by a transmitting node. These transmissions could, for example, represent the transmissions of data from an infrastructure node to one or more leaf nodes or the transmissions of data from a leaf node to one or more infrastructure nodes. These values 302 represent the actual values of the counter 214. As shown here, the counter 214 increments its value for each transmission of a message by the transmitting node.

Partial counter values 304 represent portions of the counter values 302 that are actually included in the transmitted messages. As noted above, a transmitting node could include only a subset of the bits of the counter values 302 in its transmitted messages. Here, the transmitting node includes the six least significant bits of the counter values 302 in its transmitted messages. Because the entire counter values (such as the entire 128-bit values) are not included in the messages, the transmitting node uses less bandwidth and overhead to transmit the messages.

In addition, a window 306 and a bitmap 308 can be used by a receiving node that receives the transmitted messages. The window 306 and the bitmap 308 are used by the receiving node to track messages received in the past and/or to be received in the future. For example, the window 306 and the bitmap 308 could be used to track messages that are or should have been received in the past. This allows the receiving node to determine, for instance, whether it failed to receive a message from the transmitting node. The receiving node could also verify if and when future messages during the window 306 are received from the transmitting node. The window 306 could represent a sliding window that is moved forward as messages are received over time. It may be noted that the window 306 could have any suitable size, such as a size that covers $2^n$ messages (where n equals the number of bits in the partial counter values 304). It may also be noted that the window 306 could cover any suitable number of past and future messages, such as from between (i) $2^n-2$ past messages and one future message to (ii) one past message and $2^n-2$ future messages.

The bitmap 308 can be used to track when messages containing the partial counter values 304 have been successfully received. For example, a "1" value may indicate that a message containing the corresponding partial counter value 304 has been successfully received, while a "0" value may indicate that a message containing the corresponding partial counter value 304 has not been successfully received. The bitmap 308 can therefore be used to support various functions. For instance, the receiving node could use the bitmap 308 to identify when messages were not successfully received. In this example, the bitmap 308 in FIG. 3 indicates that a message containing the "111100" partial counter value has not been received, while a message containing the "111101" partial counter value has been received. This indicates that the message containing the "111100" partial counter value may have been lost, and the receiving node could request re-transmission of that message.

As another example, the receiving node could use the bitmap 308 to ignore one or more received messages when they contain a partial counter value 304 with a marked bit (set to "1") in the bitmap 308. For example, the bitmap 308 in FIG. 3 indicates that a message containing the "111011" partial counter value 304 has been successfully received by the receiving node. If the receiving node receives an additional message containing the "111011" partial counter value 304 (before the partial counter values 304 roll back to zero and repeat a $2^n$-value sequence), the receiving node could ignore the additional message. This may be useful, for instance, in helping to avoid replay attacks, where an intruder repeats a prior message in order to interfere with the operation of the receiving node.

Although FIG. 3 illustrates one example of counter-based communications in a wireless network, various changes may be made to FIG. 3. For example, the counter values 302, partial counter values 304, and bitmap 308 values are for illustration only. Also, any suitable number of bits could be used to form the partial counter values 304, and the window 306 and bitmap 308 could each have any suitable size (whether or not those sizes correspond).

Figure 4:
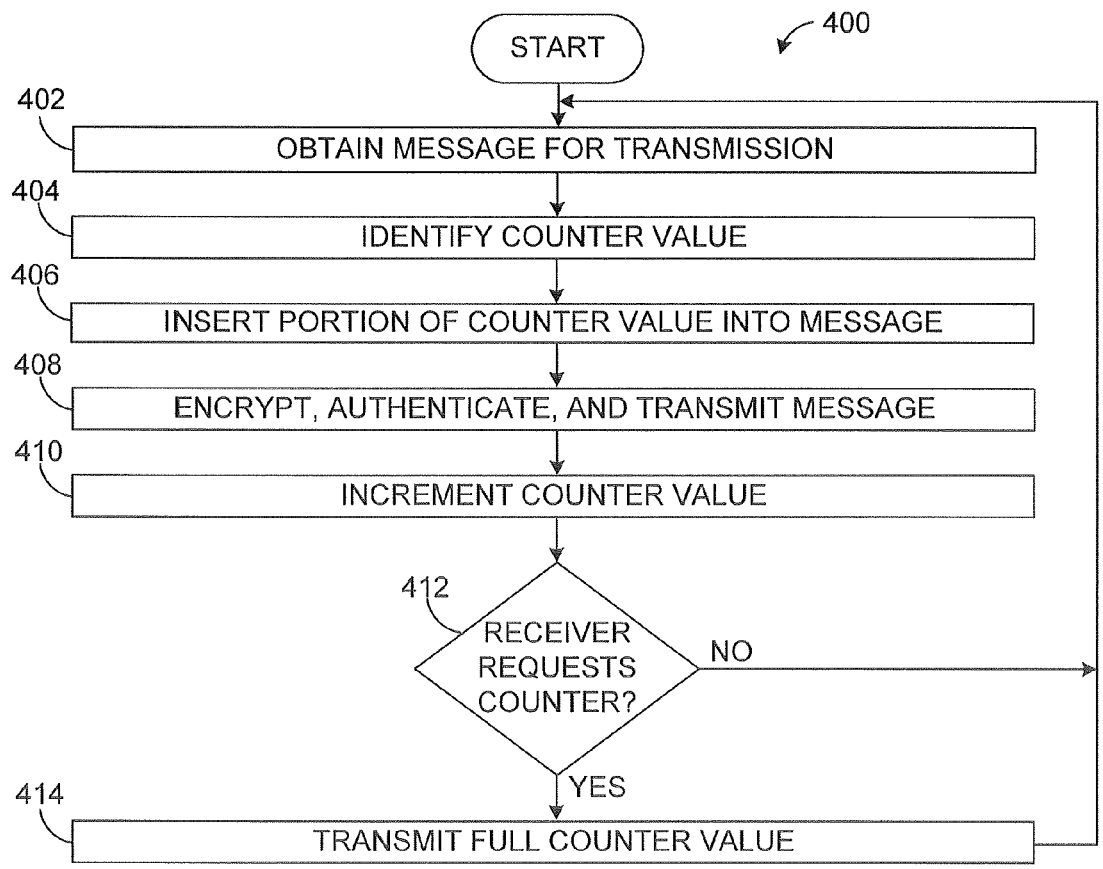
FIG. 4 illustrates an example method for counter-based transmissions of messages in a wireless network according to this disclosure.

FIG. 4 illustrates an example method 400 for counter-based transmissions of messages in a wireless network according to this disclosure. The method 400 could, for example, be performed by an infrastructure or leaf node that is transmitting messages in the system 100 of FIG. 1. The embodiment of the method 400 shown in FIG. 4 is for illustration only. Other embodiments of the method 400 could be used without departing from the scope of this disclosure.

A message to be transmitted is obtained at step 402. This could include, for example, a controller 202 in a wireless node 200 generating a message based on data it collects or generates. This could also include the controller 202 receiving data from an external source, such as data from another wireless node 200. A counter value is identified at step 404. This could include, for example, the controller 202 identifying the current value of its counter 214. A portion of the counter value is inserted into the message at step 406. This could include, for example, the controller 202 inserting the six least significant bits of the counter value into the message to be transmitted, such as into a header of the message.

The message is encrypted, authenticated, and transmitted at step 408. This could include, for example, encrypting a payload portion of the message without encrypting the header portion of the message. The encryption could involve the use of the full counter value. Also, the authentication may be performed to allow the receiving node to detect alterations of the message. The transmitting node's counter is incremented at step 410.

A determination is made whether the receiving node requests the transmitting node's counter value at step 412. In some embodiments, the receiving node may attempt to maintain synchronization with the transmitting node's counter value based on the messages received by the receiving node. However, if the receiving node loses synchronization and cannot regain synchronization on its own, the receiving node can transmit a request for the transmitting node's counter value. In response, the transmitting node transmits its counter value at step 414. This could include, for example, the transmitting node transmitting a message containing just its counter value or a message with the counter value and other contents. The transmitting node then returns to step 402 to obtain and transmit another message.

Although FIG. 4 illustrates one example of a method 400 for counter-based transmissions of messages in a wireless network, various changes may be made to FIG. 4. For example, the counter could decrement its value rather than increment its value. Also, while shown as a series of steps, various steps in FIG. 4 could overlap, occur in parallel, or occur in a different order.

Figure 5:
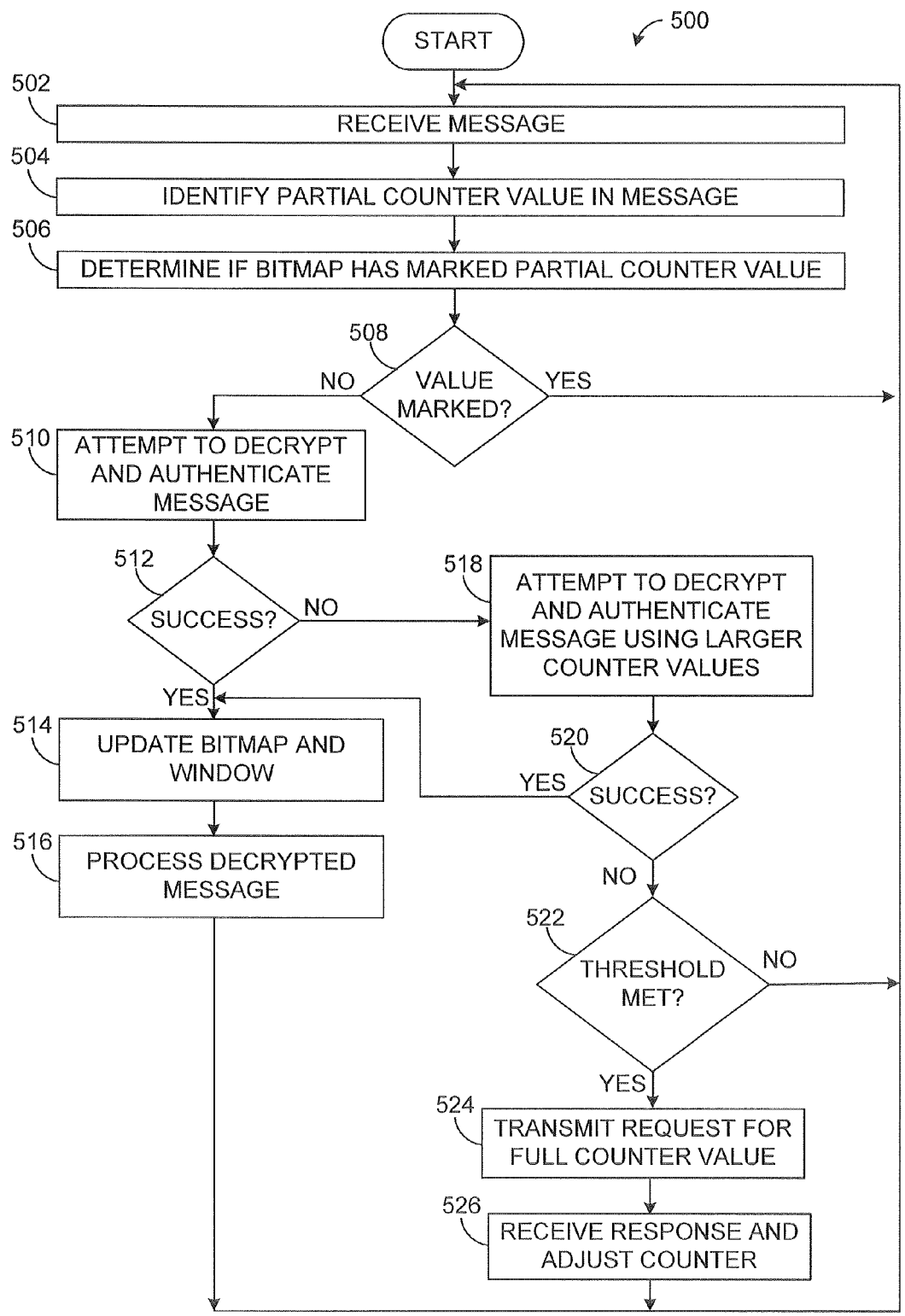
FIGS. 5 and 6 illustrate example methods for counter-based receptions of messages in a wireless network according to this disclosure.
Figure 6:
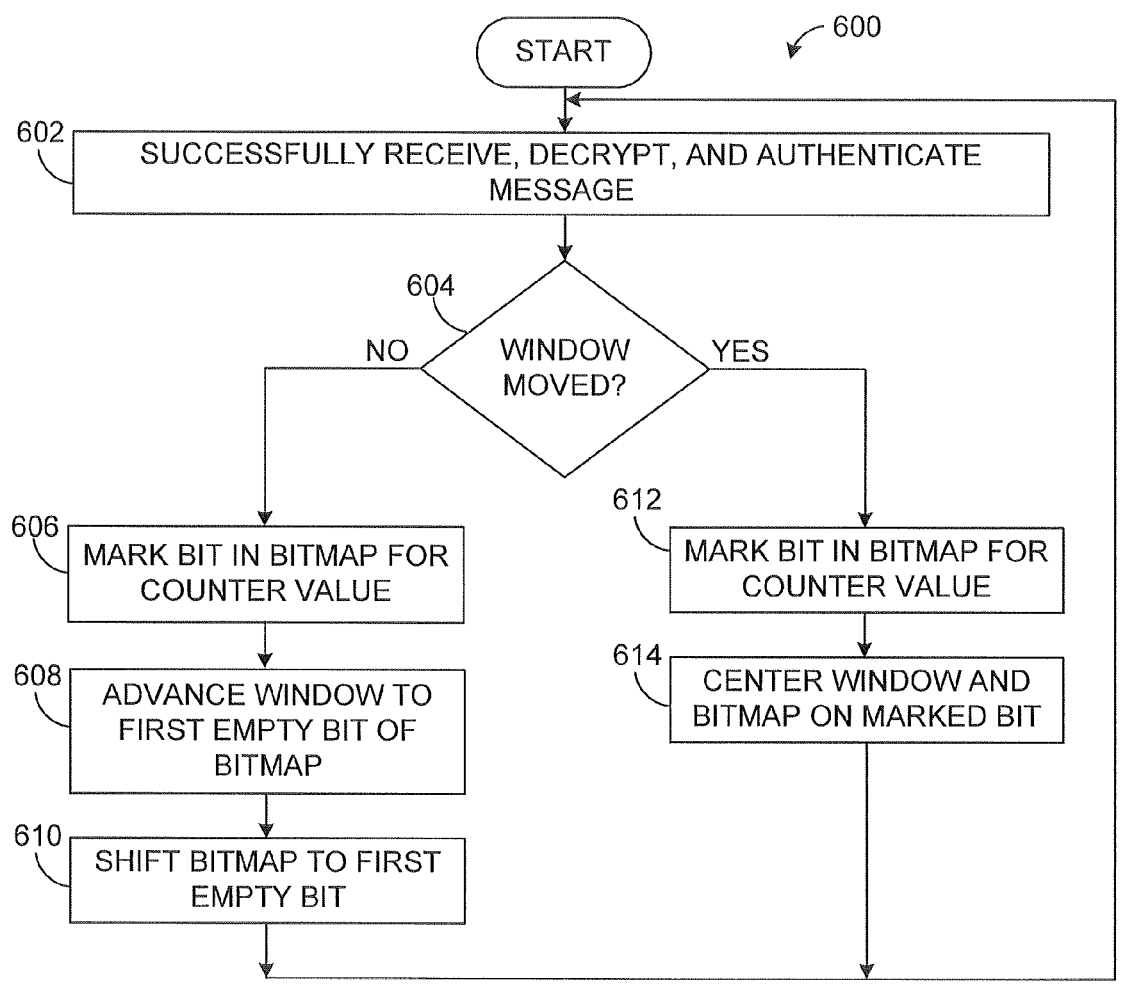

FIGS. 5 and 6 illustrate example methods 500 and 600 for counter-based receptions of messages in a wireless network according to this disclosure. The methods 500 and 600 could, for example, be performed by an infrastructure or leaf node that is receiving messages in the system 100 of FIG. 1. The embodiments of the methods 500 and 600 shown in FIGS. 5 and 6 are for illustration only. Other embodiments of the methods 500 and 600 could be used without departing from the scope of this disclosure.

As shown in FIG. 5, a receiving node receives a message at step 502. This could include, for example, the controller 202 in a receiving wireless node 200 receiving a message through its transceiver 206 and antenna 208. The receiving node identifies the partial counter value contained in the message at step 504. This could include, for example, the controller 202 in the receiving node extracting the partial counter value 304 from the received message's header.

The receiving node's bitmap is examined to determine if the partial counter value has already been marked at step 506. This could include, for example, examining the bit in the bitmap 308 that corresponds to the partial counter value 304 extracted from the message. If the bitmap indicates the partial counter value has been marked at step 508, the message is discarded and is not further processed. In this case, the message could represent a replay attack or other type of attack against the receiving wireless node.

If the bitmap indicates the partial counter value has not been marked, the receiving node attempts to decrypt and authenticate the message at step 510. This may include, for example, the controller 202 in the receiving node using the value of its own counter and the partial counter value 304 from the received message to identify or reconstruct a full counter value. As a particular example, the controller 202 in the receiving node may attempt to decrypt and authenticate the message based in part on its own counter value. For example, with reference to FIG. 3, if the current value of the receiving node's counter is "2109" (decimal) and the partial counter value 304 from the received message is "111110" (binary), the receiving node could determine that the reconstructed full counter value equals "2110" (decimal). In these embodiments, the receiving node can select the full counter value 302 within its window 306 that is associated with the partial counter value 304 from the message. The decryption and authentication steps here could be performed on the payload of the received message using the full counter value.

If the decryption and authentication are successful at step 512, the receiving node's bitmap and window are updated at step 514, and the decrypted message is further processed at step 516. One example way to update the bitmap and window is shown in FIG. 6.

Otherwise, if decryption and authentication are not successful, this may indicate that the receiving node is out of synchronization. In this case, the receiving node attempts to decrypt and authenticate the received message using larger counter values at step 518. This could include, for example, the controller 202 sliding its window 306 sixty-four periods into the future and increasing its counter value by sixty-four (if the window 306 covers $2^6$ counter values). This could also include the controller 202 resetting its bit map 308. The controller 202 could then attempt to decrypt and authenticate the received message using the counter value 302 in the current window 306 that corresponds to the partial counter value 304 in the received message. If successful at step 520, the bitmap and window are updated at step 514, and the message is processed at step 516. Note that steps 518-520 could be repeated once or multiple times, such as depending on how many times the decryption and authentication steps cam be performed before the message is discarded.

If the message still cannot be decrypted and authenticated, a determination is made whether a threshold has been met at step 522. This could include, for example, the controller 202 determining if it has been unable to decrypt a specified number of received messages (such as three). If not, the method 500 returns to step 502. Otherwise, the receiving node transmits a request for the transmitting node's full counter value at step 524 and receives a response and adjusts its own counter at step 526. In this case, the receiving node has tried and been unable to re-synchronize with the transmitting node, so the receiving node requests information from the transmitting node to enable re-synchronization.

As shown in FIG. 6, a message is successfully received, decrypted, and authenticated at step 602. This could occur as shown in FIG. 5. If the receiving node's window was not shifted in order to decrypt and authenticate the message (meaning step 518 was not performed in FIG. 5) at step 604, the receiving node marks the appropriate bit in its bitmap for the partial counter value in the message at step 606. This could include, for example, setting the appropriate bit to a value of "1" in the bitmap 308. The window used by the receiving node is then advanced at step 608, and the bitmap is shifted at step 610. This could include, for example, the controller 202 advancing the window 306 and shifting the bitmap 308 so that both begin at the first zero value in the bitmap 308. This point represents the partial counter value for the next expected or missing message.

Otherwise, if the window was shifted in order to decrypt and authenticate the message, the receiving node marks the bit in its bitmap for the partial counter value in the message at step 612. The window and bitmap are centered on the marked bit of the bitmap at step 614. This could include, for example, the controller 202 shifting the window and bitmap right or left so that the marked bit is located generally in the center of the window 306 and the bitmap 308.

Although FIGS. 5 and 6 illustrates examples of methods 500 and 600 for counter-based receptions of messages in a wireless network, various changes may be made to FIGS. 5 and 6. For example, the counter could be decremented so that smaller values are used at step 518. Also, the movements of the window and bitmap at steps 608-610 and 614 are for illustration only. The window and bitmap could be adjusted in any other suitable manner. In addition, while shown as a series of steps in each figure, various steps in each figure could overlap, occur in parallel, or occur in a different order.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The phrases "transmitting node" and "receiving node" denote different nodes during a single transmission of a message, although a node could be a transmitting node in some instances and a receiving node in the same or other instances. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
   wirelessly receiving a message at a receiving node;
   extracting a partial counter value from the message, the extracted partial counter value comprising a subset of bits from a complete counter value of a transmitting node;
   verifying the extracted partial counter value using a bitmap and a window; and
   decrypting and authenticating the message based on the extracted partial counter value;
   wherein the window is associated with a plurality of partial counter values and the bitmap comprises a plurality of bit values corresponding to the plurality of partial counter values, and wherein each bit value identifies whether its corresponding partial counter value has been received within a prior message from the transmitting node.

2. The method of claim 1, wherein verifying the extracted partial counter value and decrypting and authenticating the message comprise:
   examining the bitmap to identify the bit value that is associated with the extracted partial counter value;
   decrypting and authenticating the message if the identified bit value has a first value; and
   discarding the message if the identified bit value has a second value.

3. The method of claim 1, further comprising:
   requesting the complete counter value from the transmitting node if a specified number of messages cannot be decrypted and authenticated.

4. The method of claim 1, wherein the receiving node comprises at least one of: a wireless sensor and a wireless actuator.

5. The method of claim 1, wherein decrypting and authenticating the message comprises:
   identifying a second complete counter value at the receiving node, the second complete counter value based on the extracted partial counter value and a value of a counter at the receiving node; and
   attempting to decrypt and authenticate the message using the second complete counter value.

6. The method of claim 5, wherein decrypting and authenticating the message further comprises:
   if not successful using the second complete counter value, identifying at least one additional complete counter value and attempting to decrypt and authenticate the message using the one or more additional complete counter values.

7. The method of claim 6, wherein:
   identifying the second complete counter value comprises using the window of counter values at the receiving node; and
   identifying the at least one additional complete counter value comprises shifting the window of counter values and using the shifted window of counter values.

8. The method of claim 1, further comprising:
   updating the bitmap and the window based on the extracted partial counter value after successful authentication of the message.

9. The method of claim 8, wherein updating the bitmap and the window comprises:
   advancing the window to cover partial counter values starting with the partial counter value that is associated with a next expected message or a missing message; and
   shifting the bitmap to start at the bit value that is associated with the next expected message or the missing message.

10. The method of claim 8, wherein updating the bitmap and the window comprises:
    advancing and centering the window on the partial counter value that is associated with a most recently received authenticated message; and
    centering the bitmap on the bit value that is associated with the most recently received authenticated message.

11. An apparatus comprising:
    a transceiver configured to wirelessly receive a message; and
    a controller configured to:
       extract a partial counter value from the message, the extracted partial counter value comprising a subset of bits from a complete counter value of a transmitting node;
       verify the extracted partial counter value using a bitmap and a window; and
       decrypt and authenticate the message based on the extracted partial counter value;
    wherein the window is associated with a plurality of partial counter values and the bitmap comprises a plurality of bit values corresponding to the plurality of partial counter values, and wherein each bit value identifies whether its corresponding partial counter value has been received within a prior message from the transmitting node.

12. The apparatus of claim 11, wherein the controller is configured to verify the extracted partial counter value and decrypt and authenticate the message by:
    examining the bitmap to identify the bit value that is associated with the extracted partial counter value;
    decrypting and authenticating the message if the identified bit value has a first value; and
    discarding the message if the identified bit value has a second value.

13. The apparatus of claim 11, wherein the controller is configured to decrypt and authenticate the message by:
    identifying a second complete counter value, the second complete counter value based on the extracted partial counter value and a value of a counter;
    attempting to decrypt and authenticate the message using the second complete counter value; and
    if not successful using the second complete counter value, identifying at least one additional complete counter value and attempting to decrypt and authenticate the message using the one or more additional complete counter values.

14. The apparatus of claim 11, wherein the controller is further configured to request the complete counter value from the transmitting node if a specified number of messages cannot be decrypted and authenticated.

15. The apparatus of claim 11, wherein:
the controller is further configured to update the bitmap and the window based on the extracted partial counter value after successful authentication of the message.

16. The apparatus of claim 15, wherein the controller is configured to update the bitmap and the window by:
advancing the window to cover partial counter values starting with the partial counter value that is associated with a next expected message or a missing message; and
shifting the bitmap to start at the bit value that is associated with the next expected message or the missing message.

17. The apparatus of claim 15, wherein the controller is configured to update the bitmap and the window by:
advancing and centering the window on the partial counter value that is associated with a most recently received authenticated message; and
centering the bitmap on the bit value that is associated with the most recently received authenticated message.

18. A non-transitory computer readable storage medium embodying a computer program, the computer program comprising computer readable program code for:
obtaining a wirelessly received message;
extracting a partial counter value from the message, the extracted partial counter value comprising a subset of bits from a complete counter value of a transmitting node;
verifying the extracted partial counter value using a bitmap and a window; and
decrypting and authenticating the message based on the extracted partial counter value;
wherein the window is associated with a plurality of partial counter values;
wherein the bitmap comprises a plurality of bit values corresponding to the plurality of partial counter values, and
wherein each bit value identifies whether its corresponding partial counter value has been received within a prior message from the transmitting node.

19. The non-transitory computer readable storage medium of claim 18, wherein the computer readable program code for verifying the extracted partial counter value and the computer readable program code for decrypting and authenticating the message comprises computer readable program code for:
examining the bitmap to identify the bit value associated with the extracted partial counter value;
decrypting and authenticating the message if the identified bit value has a first value; and
discarding the message if the identified bit value has a second value.

20. The non-transitory computer readable storage medium of claim 18, the computer program further comprising computer readable program code for:
updating the bitmap and the window based on the extracted partial counter value after successful authentication of the message.

* * * * *